United States Patent [19]

Meyerson et al.

[11] 4,270,249
[45] Jun. 2, 1981

[54] CLASP FOR A BRACELET OR THE LIKE

[75] Inventors: Stanley Meyerson, Brooklyn, N.Y.; Seymour Hauser, North Bergen, N.J.

[73] Assignee: Admiral Watchband Co., Inc., New York, N.Y.

[21] Appl. No.: 9,433

[22] Filed: Feb. 5, 1979

[51] Int. Cl.³ ............................................. A44B 13/00
[52] U.S. Cl. ............................ 24/241 PP; 24/241 SP
[58] Field of Search ........ 24/73 WW, 241 R, 241 PP, 24/241 S, 241 SB, 241 SP, 265 H, 265 WS, 248

[56] References Cited

U.S. PATENT DOCUMENTS

| 1,754,959 | 4/1930 | Matushenko | 24/73 WW X |
| 2,058,957 | 10/1936 | Dalo | 24/241 SP X |
| 2,186,438 | 1/1940 | Weiner | 24/73 WW X |
| 2,453,993 | 11/1948 | Kreisler | 24/265 WS X |
| 2,554,184 | 5/1951 | Gerstenblith | 24/241 SP |
| 2,633,619 | 4/1953 | Rodriguez | 24/241 SP |
| 3,404,440 | 10/1968 | Weiss | 24/241 R |
| 3,557,412 | 1/1971 | Hauser | 24/241 R X |

FOREIGN PATENT DOCUMENTS

| 148184 | 8/1936 | Austria | 24/241 PP |
| 698192 | 11/1930 | France | 24/73 WW |
| 838678 | 12/1938 | France | 24/73 WW |
| 1087333 | 4/1954 | France | 24/241 SB |
| 392122 | 9/1965 | Switzerland | 24/241 R |

Primary Examiner—Thomas J. Holko
Attorney, Agent, or Firm—Lackenbach, Lilling & Siegel

[57] ABSTRACT

A detachable clasp or lock for a bracelet, or the like, includes a receiver having a free end hook, a loop for removable engagement in the hook, a pair of inner and outer covers hinged to the receiver for swinging movement relative thereto and having catches engageable about the end hook for retaining the received loop, the catches being swingable together for ease of opening and having a lost motion mechanism enabling one catch to remain engaged in the event the other catch is inadvertently opened.

16 Claims, 17 Drawing Figures

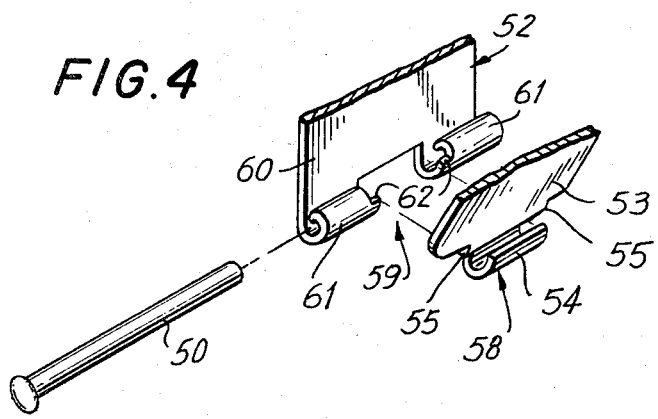
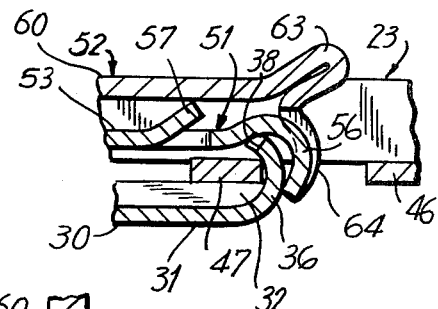
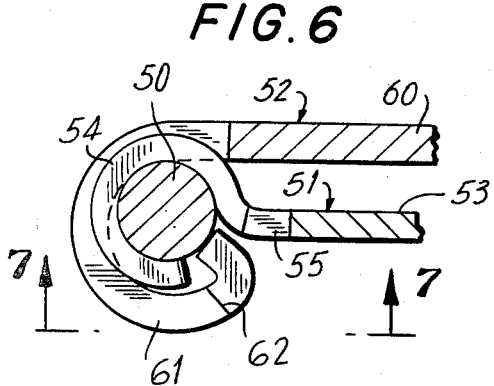
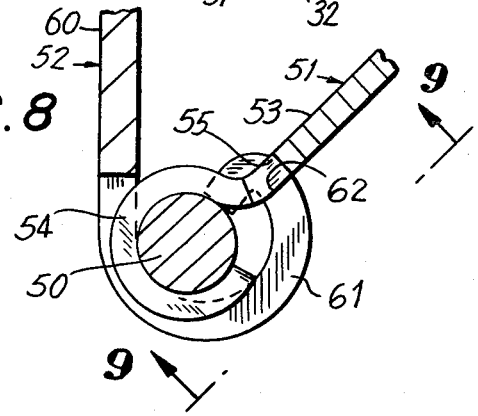
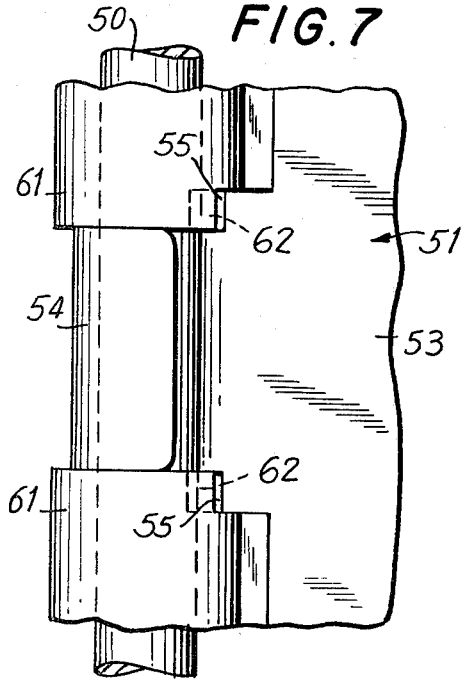
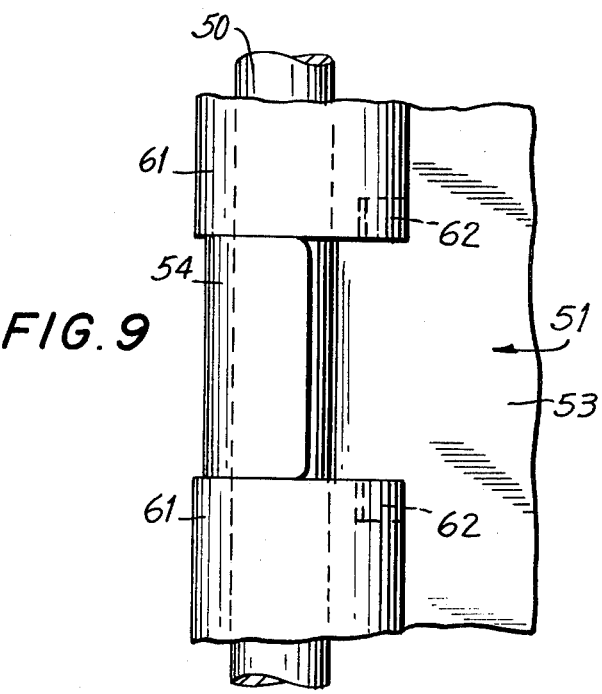

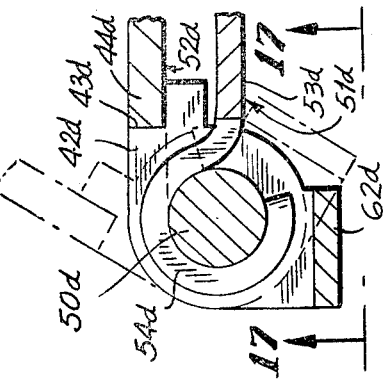
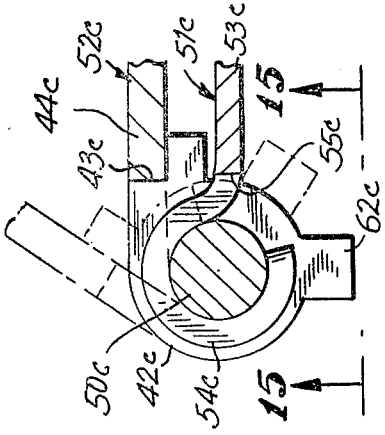
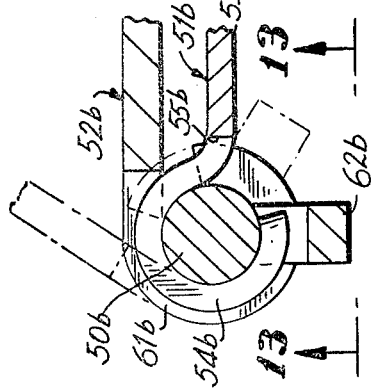
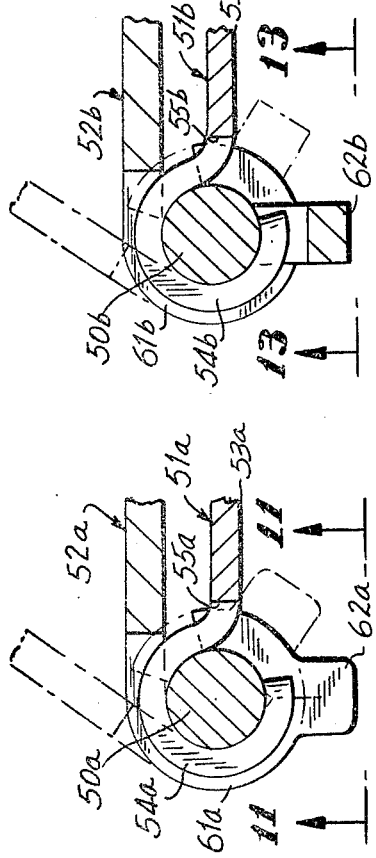
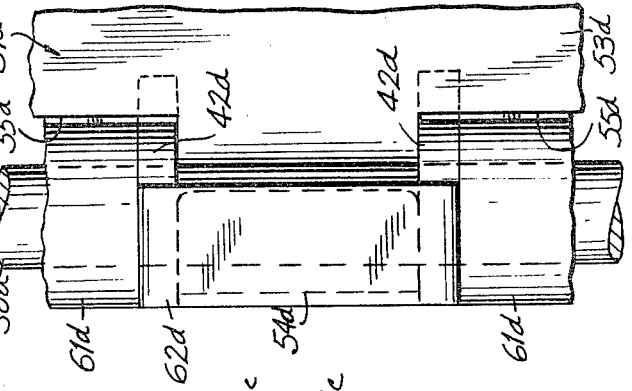
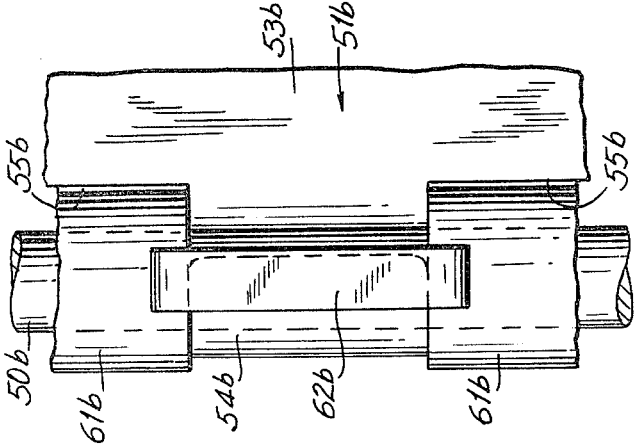
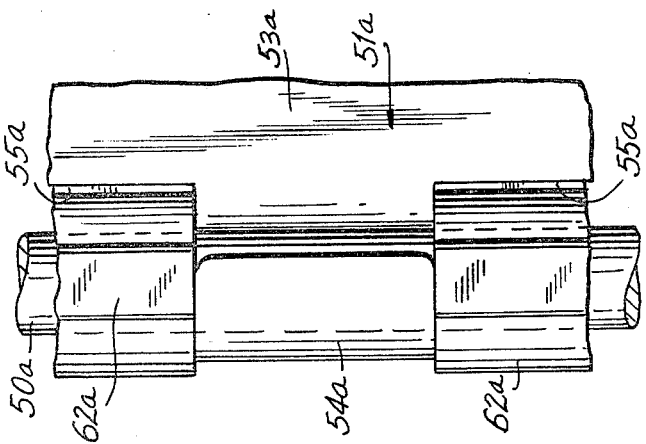

CLASP FOR A BRACELET OR THE LIKE

BACKGROUND OF THE INVENTION

It is appreciated that the bracelet, clasp or lock art is highly developed and includes a number of proposed constructions including double or multiple locking elements for safety in the event one becomes accidentally unlocked. However such prior art devices have not been entirely satisfactory, as they are generally extremely difficult to open, particularly the second inner or smaller locking element or safety catch, which often results in broken fingernails to the operator. Also, double locking clasps of the prior art are generally incapable of simple adjustment, as by the user rather than a skilled artisan, without losing the double lock feature.

Applicant is not aware of any prior art which would prevent the issuance of a patent on this application.

SUMMARY OF THE INVENTION

It is an important object of the present invention to provide a lock or clasp for a bracelet which overcomes the abovementioned difficulties of the prior art and provides the security of double locking. Such a lock or clasp includes a safety catch. Both locking elements may be substantially simultaneously opened by a quick and easy procedure, while retaining the security of a closed safety catch in the event of inadvertent or accidental opening of the outer locking element.

Further, the safety catch may be quickly and easily opened, by itself, in the event it remains closed after full opening of the outer lock.

The invention further includes, as an option, a hook structure retaining the bracelet on a wearer's arm, even though the double locking elements are open, as before locking or after opening, for convenience in applying the bracelet and removing the same, as well as for additional safety against loss.

The invention further includes, as an option, a provision for conveniently adjusting the bracelet size by the wearer, without loss of the advantageous double locking feature of the preceding paragraphs.

It is still another object of the present invention to provide a clasp or lock for a bracelet or the like having the advantageous characteristics set forth in the preceding paragraphs, which is relatively simple in construction for ease and economy in manufacture, is extremely durable and reliable over a long useful life while permitting relatively small and attractive proportions, and otherwise fully accomplishes its intended objects.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

DESCRIPTION OF THE DRAWINGS

FIG. 4 is a partial, exploded perspective view showing certain elements of construction, and illustrating a lost motion mechanism of the present invention.

FIG. 5 is a partial sectional view taken generally along the line 5—5 of FIG. 3 and enlarged for clarity.

FIG. 6 is a sectional elevational view taken generally along the line 6—6 of FIG. 3 and enlarged for clarity.

FIG. 7 is a partial bottom view taken along the line 7—7 of FIG. 6.

FIG. 8 is a sectional view similar to FIG. 6, but illustrating the covers in an open condition, as in FIG. 2.

FIG. 9 is a fragmentary view taken generally along the line 9—9 of FIG. 8.

FIG. 10 is a partial sectional view similar to FIG. 6, but showing a slightly modified embodiment, and illustrating an intermediate position of opening in phantom.

FIG. 11 is a bottom view taken generally along the line 11—11 of FIG. 10.

FIG. 12 is a sectional view similar to FIG. 10, but showing another slightly modified embodiment, and illustrating an intermediate position of opening in phantom.

FIG. 13 is a bottom view taken generally along the line 13—13 of FIG. 12.

FIG. 14 is a sectional elevational view similar to FIGS. 10 and 12, showing still another embodiment of the invention and illustrating an intermediate opening position in phantom.

FIG. 15 is a bottom view showing the embodiment of FIG. 14.

FIG. 16 is another partial sectional view similar to FIGS. 10, 12 and 14, showing another embodiment and illustrating an intermediate position of opening in phantom.

FIG. 17 is a bottom view taken generally along the line 17—17 of FIG. 16.

DESCRIPTION OF THE PREFERRED EMBODIMENT

Figure 1:
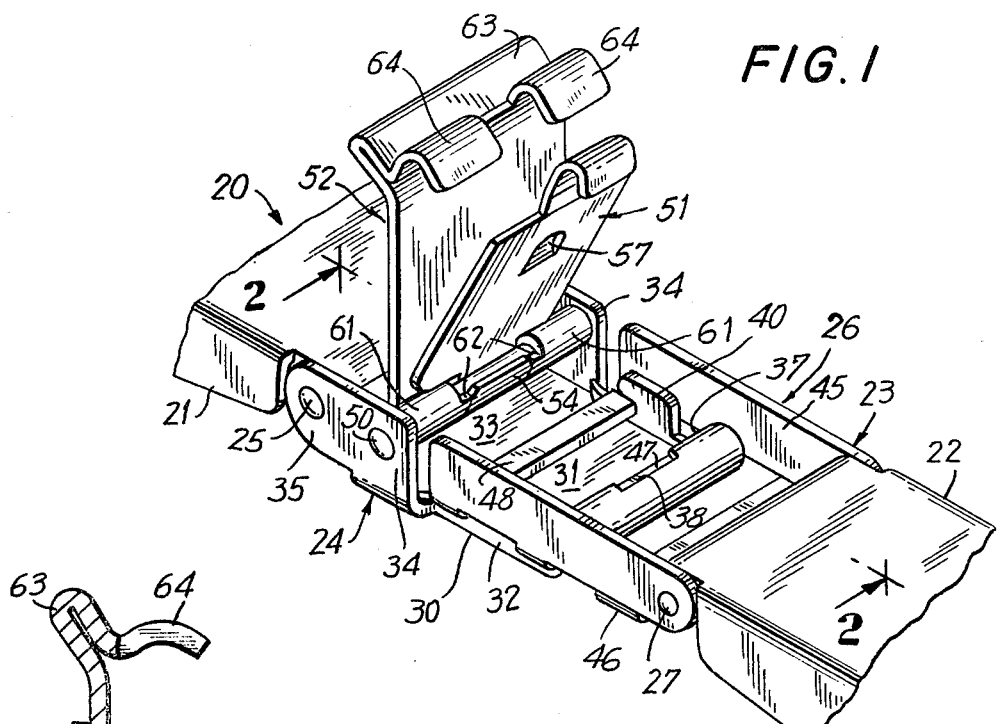
FIG. 1 is a perspective view of the lock or clasp in an open position, preparatory to locking or disconnecting the parts, with both major assemblies thereof interengaged.
Figure 2:
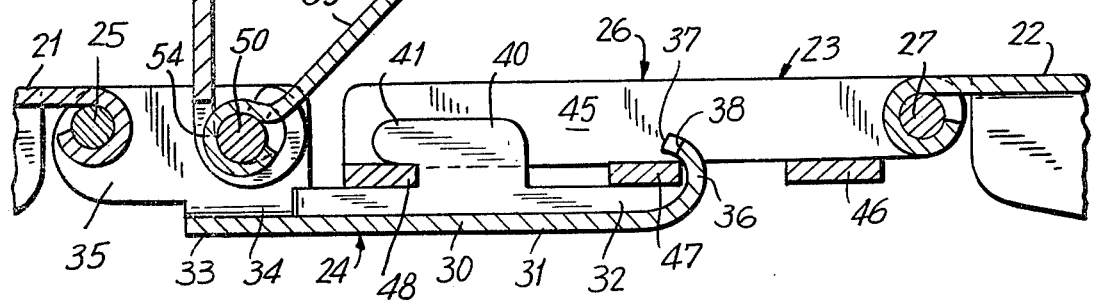
FIG. 2 is a sectional view taken generally along the line 2—2 of FIG. 1.
Figure 3:
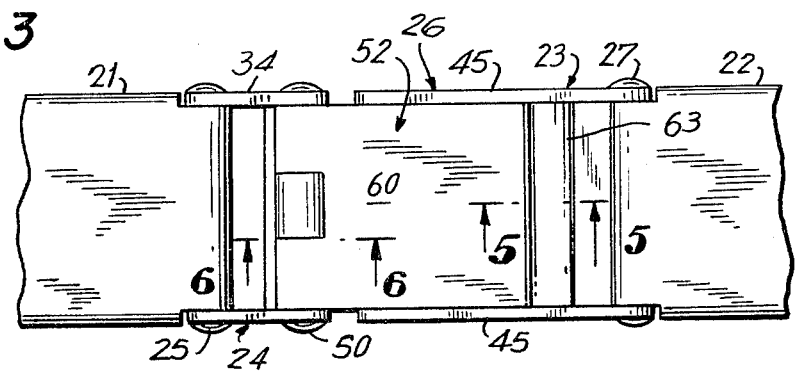
FIG. 3 is a top plan view showing the clasp of FIGS. 1 and 2 in a closed position.

Referring now more particularly to the drawings, and specifically to FIGS. 1-3 thereof, a strap or bracelet is generally designated 20, and may include a pair of end members or links 21 and 22 having connected therebetween a detachable clasp, buckle or lock, generally designated 23.

The clasp or lock 23 may be constituted of a pair of connectable and disconnectable component parts, including a receiver assembly 24 pivotally connected at its inner end to link 21, as by a pin 25. The clasp also includes an engager part or loop 26 connectable to and disconnectable from the receiver assembly 24 and having its inner end suitably connected, as by pivot pin 27, to the adjacent link 22.

The receiver assembly 24 may include a receiver element 30 having a bottom or inner wall 31 provided along opposite side edges with upstanding side flanges 32. That is, the side flanges 32 extend along opposite side edges of the bottom wall 31 from the outer or distal end thereof inwardly to an inner end portion 33. The inner end portion 33 is slightly laterally enlarged and is provided with opposite side edges with upstanding side walls or lugs 34, which extend upward considerably above the side flanges 32. Further, the side walls or lugs 34 project inwardly beyond the inner end region 33 of the receiver bottom wall 31 to define ears 35.

The distal, remote or outer end of the receiver bottom wall 31 is provided with a laterally coextensive, upwardly and inwardly curved integral extension or end hook 36. The end hook 36 is an arcuate or angular measure of about 180° and terminates in a generally inwardly facing end edge 37 spaced outwardly of and over the side flanges 32. Thus, the end hook 36 opens generally on the outer or upper side of the receiver 30, and the end edge 37 of hook 36 is laterally medially recessed or cut away, as at 38.

Each of the side flanges 32, at a location positioned longitudinally to the receiver 30 and spaced inwardly from the end hook 36, is provided with an upstanding retainer or lug 40, having a longitudinally inwardly projecting extension 41 spaced over the adjacent nether portion of side flange 32. Thus, the lugs 40 on the side flanges 32 are each adjacent to and terminate short of respective proximate side walls 34. More specifically, each upstanding lug 40 is located adjacent to and laterally inwardly of its proximate side wall 34, with projection 41 projecting toward and terminating short of the respective side wall.

The engager part or loop 26 of the clasp 23 may be an open framework or loop-like structure, including a pair of laterally spaced, generally parallel side pieces 45 connected together by a plurality of generally parallel, spaced laterally extending crosspieces or cross-members 46, 47 and 48, which crosspieces may be generally coplanar and extend between the lower edges of the side pieces 45. More specifically, the crosspiece 46 is innermost and extends between the regions of the side pieces 45 adjacent to the inner ends of the latter. The crosspiece 48 is outermost and extends between the regions of the side pieces adjacent to the outer ends thereof. The crosspiece 47 extends between intermediate regions of the side pieces. In addition, extending between the inner end regions of the side pieces 45 is the pivot pin 27, by which the open frame member or loop 26 is pivotally connected to the adjacent end link 22. As will appear more fully hereinafter, the open member or framework serves to removably receive projections or hooks to function in the manner of an open loop or loops, and may be so considered.

The longitudinal members or side pieces 45 of the loop 26 are laterally spaced apart a distance approximately equal to the lateral spacing of the side walls 34 of the receiver part 24. Further, the reduced lateral extent of the receiver bottom wall 31 and side flanges 32 corresponds generally to the lateral dimension between the inner surfaces of the side pieces 45. Thereby, the in-turned end extension or hook 36 may be engageable upwardly through an open space between side pieces 45, as between cross members 46 and 47, for hooked engagement about the cross member 47. As best seen in FIG. 2, the cross member 47 is designed to enter through the open outer side of end hook 36 into the latter between the end edge 37 and the adjacent portions of the side flanges 32.

Simultaneously, the outermost cross-member 48 is engageable within the hook-like lugs 40, as between the projecting extensions 41 and the adjacent portions of the side flanges 32. In this manner the loop 26 is more positively interengaged with the hook 36 and the lugs 40 of the receiver 24. However, if a slight adjustment for enlarging the band or bracelet 20 is desired, the endmost laterally extending crosspiece 48 may be engaged within the end hook 36.

Extending laterally between the side walls 34 is a hinge pin 50, upon which inner and outer covers or catches 51 and 52 are pivotally or swingably mounted. Inner cover 51 may include a generally rectangular sheet or plate 53 provided on one end with an integral arcuate extension 54 curled about the hinge pin 50. That is, the curled extension 54 is of laterally reduced dimension so as to be curled about the medial region of the pin 50 to define an arc of greater than 180° to rotatably mount the cover plate 53 for swinging movement about the hinge pin. Thus, the curled extension 54 and the hinge pin 50 define a hinge knuckle 58; and, further, the knuckle extends from the cover plate 53 generally normal thereto upwardly so as to locate the cover plate 53 relatively closely to and overlying the receiver bottom wall 31 upon movement of the cover plate toward the receiver. The curled extension 54 is considerably laterally reduced with respect to the cover plate 53. There is provided at the juncture of the cover plate with the curled extension 54 a pair of lifting lips or abutments 55 outstanding laterally beyond opposite sides of the curled extension 54, as best seen in FIG. 4.

Extending from the distal end of the inner cover plate 53, remote from the hinge knuckle 58, there is an integral inwardly or downwardly opening clip or clasp or catch 56, in the general configuration of a downwardly bent finger or hook. The clasp or finger 56 is of laterally reduced dimension with respect to the cover plate 53 and is resiliently deflectable for snap engagement over the end hook 36 upon downward or inward swinging movement of the inner cover 51 into overlying relation with the receiver 31. This snap engagement of the clasp 56 exteriorly about the end hook 36, overlying the open side of the latter, is best seen in FIG. 5, wherein it may be observed that the laterally reduced clasp 56 may nest in recess 38 for increased snap frictional engagement about the end hook.

The inner cover 51 is further provided with a finger tab or lifting projection 57 to facilitate disengagement of the clasp 56 from the hook 36, should such be necessary.

The outer cover 52 may include a generally flat outer plate 60 having a pair of curled integral inner end extensions 61 laterally spaced apart on opposite sides of the hinge knuckle 58 and curving about the latter to mount the outer cover for swinging movement about the pin 50 into and out of overlying relation with both the receiver 30 and the inner cover 51. The laterally spaced curled end extensions 61 and the hinge pin 50 thus define hinge knuckles 59 in alternate or interdigitated relation with respect to the intermediate hinge knuckle 58. The hinge knuckles 59 may extend generally coplanar from the outer cover plate 60, and thence downwardly and about pin 50, so as to overlie the inner cover plate 51.

In addition, each of the outer cover curled end extensions 61 may be formed on its laterally inner edge with an upwardly or outwardly facing abutment shoulder or lifting edge 62 located in facing spaced relation with respect to the adjacent abutment or lip 55 of the inner cover 51.

Remote from the hinge knuckles 59, the outer cover plate 60 may be formed with an outstanding crimp or fold 63, defining a manually actuable pull element, and, extending therefrom in laterally spaced relation, a pair of arcuate spring fingers or clasps or catches 64. The resilient clasps 64 are somewhat hookshaped and spaced laterally for swinging movement into snap engagement about the end hook 36, as best seen in FIG. 5, on opposite sides of the laterally medial clasp 56. Thus, the laterally spaced outer clasps 64 are located in embracing snap engagement with adjacent but separate parts of the end hook 36 as is the intermediate spring finger or clasp 56.

It will therefore be appreciated that the inner and outer covers 51 and 52 are independently pivotally mounted for swinging movement about the axis of pin 50 with their clasps swingable into snap engagement with adjacent portions of end hook 36. In this manner, the cross-members 47 and 48 of loop 26 are effectively retained in received relation with respect to the end hook 36 and the lugs 40. Further, should the outer cover 52 become accidentally disengaged or opened, as by removal of its clasps 64 from snap engagement with the end hook 36, the inner cover 51 remains in its protective overlying relation with the receiver 30 and the crosspieces 47 and 48.

However, upon substantial outward swinging movement of outer cover 52, the lifting edges or abutments 62 rotatable with the outer cover 52 will move into abutting engagement with the lifting lips or abutments 55 of the inner cover 51 and thereby effect simultaneous outward swinging or opening movement of the inner cover 51 out of its protected overlying relation with the receiver 31 and the crosspieces 47 and 48. This condition is best shown in FIGS. 2 & 8. Thus, the convenience of simultaneous opening of the double closure or inner and outer covers 51 and 52 is effected by the abutting engagement of abutments 62 and 55. As these abutments are spaced apart in the fully closed cover position, there is provided a degree of relative movement between the covers, thus defining a lost motion mechanism, which permits an accidental opening to a minimal extent of the outer cover without a simultaneous opening of the inner cover, to afford full safety and security to the band 20.

Thus, the abutments 62 and 55 of the outer and inner covers 52 and 51 define a connection between the covers affording the convenience of simultaneous swinging movement of the covers when desired, while they are still sufficiently spaced apart in the fully closed positions of the covers to afford some motion therebetween such that a small amount of relative cover movement may exist without accidental opening of both covers.

In FIGS. 10 and 11, there is shown a slightly modified form of connection between the outer and inner covers, which connection provides some degree of relative motion between the covers in substantially the same manner as described hereinbefore. More particularly, an inner cover 51a includes a laterally medial hinge knuckle 54a curled about a hinge pin 50a. An outer cover 52a includes a pair of laterally spaced hinged knuckles 61a curled about the hinge pin 50a on opposite sides of the hinge knuckle 54a. Further, the laterally spaced outer hinge knuckles 54a are provided with projections 62a radially of the pin 50a, as by crimping of the knuckle material. The projections 62a are swingable with the outer cover 52a upon opening movement thereof to abut with under surfaces 55a of the inner cover 15a to swing the latter open upon the swinging movement opening the outer cover. As the radially projecting abutments 62a are spaced from the abutment surfaces 55a when the covers are in their closed, overlying position, there is defined a lost motion mechanism, and there is a certain amount of motion possible, so as to enable the outer cover to the opened to a certain extent without simultaneous opening of the inner cover.

Another embodiment is shown in FIGS. 12 and 13, wherein the inner cover 51b is provided with a laterally medial hinge knuckle 54b, and the outer cover 52b is provided with a pair of laterally spaced hinge knuckles 61b on opposite sides of the intermediate hinge knuckle 54b.

A bridging member 62b extends radially from each hinge knuckle 61b in bridging relation with the intermediate hinge knuckle 54b. More particularly, the radial projection 62b is generally U-shaped, with its legs extending radially from the laterally spaced hinge knuckles 61b and its bight region extending across the intermediate hinge knuckle 54b.

In the fully closed position of the inner and outer covers 51b and 52b, the generally U-shaped abutment 62b is spaced from the underside of the inner cover plate 53b, thereby permitting relative opening movement of the outer cover 52b to the illustrated phantom position without simultaneous opening of the inner cover 51b. Upon the continued movement of the outer cover 52b the abutment 62b engages an abutment undersurface 55b of the inner cover plate 53b to cause opening swinging movement of the latter together with the outer cover.

Referring now to the embodiment of FIGS. 14 and 15, an inner cover is there generally designated 51c and is provided with a laterally intermediate hinge knuckle 54c rotatably curled about a hinge pin 50c. An outer cover 52c includes a pair of laterally spaced hinged knuckles 61c curled about the hinge pin 50c on opposite sides of and spaced from the intermediate hinge knuckle 54c. In the spaces between the intermediate hinge knuckle 54c and each laterally outer hinge knuckle 61c, there may be provided an insert 42c of generally annular configuration circumposed about hinge pin 50c. The inserts 42c may each be provided with a notch 43c in receiving engagement with an adjacent portion 44c of the outer cover 52c, to urge each insert 42c to rotative movement with its adjacent hinge knuckle 61c.

Further, each generally annular insert 42c is provided with a radial extension or abutment 62c swingable with its adjacent hinge knuckle 61c upon opening movement of the outer cover 52c into engagement with an abutting portion 55c of the inner cover 51c. This abutting engagement is shown in the phantom position of FIG. 14. The projecting abutment 62c and the abutting portion 55c of inner cover 51c are spaced apart in the fully closed condition of the covers 51c and 52c, and engage only after a certain amount of relative opening movement of the outer cover with respect to the inner cover, to function advantageously in the same manner as the hereinbefore described embodiments.

The final embodiment, shown in FIGS. 16 and 17, includes inner and outer covers 51d and 52d having respective hinge knuckles 54d and 61d, which may be substantially the same as the embodiment shown and described in connection with FIGS. 14 and 15, so as to provide space between the hinge knuckles. Interposed in such spaces, surrounding the hinge pin 50d may be a pair of generally annular inserts 42d, each provided with a notch or suitable formation 43d for interfitting engagement with an adjacent portion 44d of the outer cover 52d, to assure rotation of the inserts with the outer cover. A generally U-shaped bridging member 62d projects radially from both inserts 42d and extends in bridging relation across the intermediate hinge knuckle 54d, the bridging member 62d being spaced from the inner cover plate 53d when the covers are closed. Upon relative opening swinging movement of the outer cover 52d to the position shown in phantom in FIG. 16, the projecting bridge or abutment 62d engages with a complementary abutment portion 55d to effect subsequent simultaneous opening movement of the covers. Thus, the spacing between abutments 62d and 55d in the closed cover position defines the motion mechanism and permits a certain amount of opening of the outer cover without simultaneous opening of the inner cover and the advantageous characteristics thereof, as described hereinbefore.

From the foregoing, it will be appreciated that the present invention provides a lock, buckle or clasp, as for a bracelet or the like, which affords enhanced security of a double closure or cover. The convenience of simultaneous opening of all the closures or covers is provided, while preserving the security of enabling the outer closure or cover to open independently of the inner closure or cover a certain minimal amount to assure the safety and security of the clasp. The invention disclosed herein further advantageously permits simple and easy adjustment by the operator as between larger and smaller band openings. The clasp is self-retaining in a connected condition for locking and unlocking thereof for convenience in application to and removal from the person of a wearer.

Although the present invention has been described in some detail by way of illustration and example for purposes of clarity of understanding, it is understood that certain changes and modifications may be made within the spirit of the invention.

What is claimed is:

1. A clasp for a bracelet or the like comprising: a receiver for connection to one end of said bracelet; an end hook on the distal end of said receiver and having an opening on one side of said receiver; a loop for connection to another end of the bracelet and removably engageable in said end hook through the opening thereof; a first cover hinged to said receiver and swingable into and out of overlying relation with said receiver and said end hook on said one side of said receiver; a catch on said first cover for releasable snap engagement about said end hook for releasably retaining said loop in said end hook; a second cover hinged to said receiver and swingable with said first cover into and out of overlying relation with said first cover and said receiver; a catch on said second cover for releasable snap engagement about said end hook; connection means for operatively connecting said first and second covers for simultaneous swinging movement enabling simultaneous opening of said covers; and lost motion means associated with said connection means for affording limited relative movement between said covers before simultaneous movement of said covers.

2. A clasp according to claim 1, further comprising a lift tab on said first cover for manually disengaging said first mentioned catch from said end hook.

3. A clasp according to claim 2, further comprising a lift tab on said second cover for manually disengaging said second cover from said end hook.

4. A clasp according to claim 3, wherein said catches are located for snap engagement about separate regions of said end hook.

5. A clasp according to claim 4, wherein said catch of said second cover extends across the open side of said end hook in said releasable snap engagement to augment releasable retention of said loop in said end hook.

6. A clasp according to claim 5, wherein said catch of said second cover extends exteriorly about said end hook.

7. A clasp according to claim 1, further comprising first and second hinge means on which said covers are respectively mounted for swinging movement; wherein said connection means comprises an abutment on said second hinge means engageable upon outward swinging movement of said second cover with an abutment surface on said first hinge means to effect outward swinging movement of said first mentioned cover.

8. A clasp according to claim 7, wherein said abutment and said abutment surface are spaced apart when said covers are in said overlying relation to define said lost motion means.

9. A clasp according to claim 8, further comprising a hinge pin on said receiver, said first and second hinge means extending from respective covers in adjacent relation with each other and being rotatable about said hinge pin.

10. A clasp according to claim 9, wherein said abutment comprises a tangentially facing shoulder.

11. A clasp according to claim 9, wherein said abutment comprises a radial projection.

12. A clasp according to claim 9, wherein said abutment extends between an alternate pair of hinge knuckles of said second cover in briding relation with an intermediate hinge knuckle of said first cover for movement into abutting engagement with said abutment surface of said first cover.

13. A clasp according to claim 9, wherein said hinge means are in side by side relation, and said abutment extends from said second hinge means of said second cover for engagement with said abutment surface of said first cover.

14. A clasp according to claim 13, wherein said abutment comprises a radial projection and a lateral projection on said radial projection for engagement with said abutment surface on said first cover.

15. A clasp according to claim 1, further comprising an additional crosspiece on said loop for selective engagement in said end hook to adjust the length of said bracelet.

16. A clasp according to claim 15, further comprising an additional hook on said receiver for selective reception of said loop when said additional crosspiece is engaged in said end hook.

* * * * *